United States Patent Office 3,116,663
Patented Jan. 7, 1964

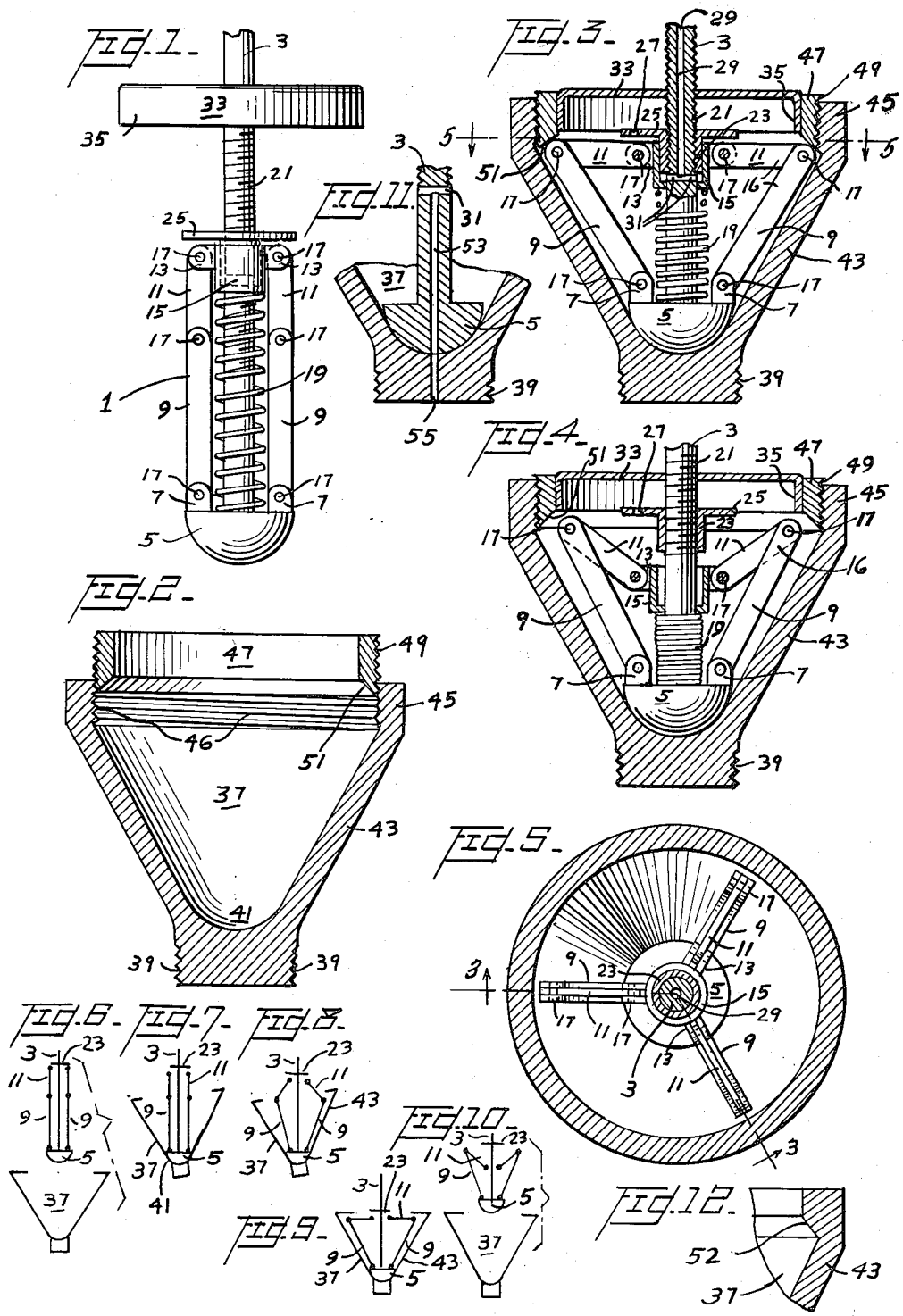

3,116,663
ATTACHMENT RELEASE SEPARATION SYSTEM
Daniel D. Musgrave, 8201 Caraway St.,
Cabin John, Md.
Filed Feb. 26, 1962, Ser. No. 175,760
11 Claims. (Cl. 89—1.5)

This invention relates to attachment-release-separation systems wherein one body may be attached to and released and forcibly separated from another body.

The invention will be disclosed herein as applied to the attachment to and release, and separation of an object or load from a structural support, such as an aircraft or other vehicle.

The invention is particularly applicable to the attachment of a load to a support where the load is heavy and unwieldy and where the alignment of the attaching parts on the load and support is subject to unsteady conditions or relative movements therebetween, such as those conditions experienced when attaching heavy bombs to aircraft aboard ships at sea.

In the embodiment disclosed, the three functions of the combination of the parts constituting the invention, are attachment of one body to another, the release of the said body from the other and the forceful separation of said one body from the other. It is apparent that when the supported body is heavy, as are some bombs, the third function of forced separation may not be necessary. The invention is complete and operative under many practical conditions, when but the attachment and release functions of the invention are performed.

A preferred embodiment of the invention will be disclosed as a conical socket fastened to a body that is supported vertically below a structure by a plug that is fastened to that supporting structure. When the body and its socket are moved upwardly to and beyond the position of contact with the lower end of the plug, a plurality of toggles, which are parts of the plug, are expanded outwardly into contact with an inner surface at the rim of the socket, which surface is defined herein as the "buttress" surface. The linear dimensions of the socket and the angle of the buttress surface thereof to the vertical and the linear dimensions of the plug and the links constituting the toggles are such that when the upper ends of the lower links are in contact with the buttress surface, the other links of the toggles are substantially horizontal and in contact at their outer ends with the buttress surface. The lower links in this condition exert a vertical support component against the socket and the horizontal links prevent the lower links from moving inward away from the buttress surface and also prevent any sway movement between the load and the supporting structure.

To release the load from the supporting structure the inner ends of the horizontal links are moved downward by a distant controlled force, such as a fluid under pressure. This downward movement of the horizontal links collapses the toggles and the upper ends of the lower links are drawn away from the buttress surface.

Should the socket fail to fall away from the plug upon the collapsing inwardly of the toggles, as may occur when the plug and socket are not in a vertical line with each other or for any other cause, the fluid under pressure will fill the space between the socket and the plug and thus forcibly separate the socket from the plug.

While the disclosure shows a single plug and a single socket it is obvious that a tandem arrangement could be used, with fluid control pressure supplied from a common source. Tandem suspension is common practice in present-day bomb racks. This invention could also be employed in multiple for multiple-point suspension.

The principal object of the invention is to provide an attachment-release-separation system.

Another object of the invention is to provide such a system in which the cooperating parts correct themselves in relative positions for mis-alignment between load and the supports during the process of attachment.

Another object of the invention is to provide such a system in which cooperating parts provide sway-bracing.

Another object of the invention is to provide such a system in which the release of the load from the supporting structure is effected by distant control.

Another object of the invention is to provide such a system in which the said release and said separation are effected by a distant control source.

Another object of the invention is to provide such a system in which the axes extending through the load and the support parts after attachment may be in a vertical line or otherwise.

Another object of the invention is to provide such a system in which the structural parts of a socket on a load and of a plug on a support cooperate to correct for mis-alignment of load and support during attachment, hold the socket to the plug and, by a distant control, release and separate the load from the support.

Other objects and advantages of the invention will be apparent from the following description of the invention as hereinafter set forth in detail and from the drawings made a part thereof in which:

FIG. 1 is a side elevation view of the plug;

FIG. 2 is a sectional view of the socket;

FIG. 3 is a side view partly in section showing the plug and socket in attachment relation;

FIG. 4 is a side view partly in section showing the plug and socket in release and separation relation;

FIG. 5 is a sectional view taken on line 5—5 of FIG. 3;

FIGURES 6, 7, 8, 9 and 10 are a schematic sequence of views showing the relative positions of parts of the plug and the socket during the process of attaching, releasing and separation of the load from the support.

FIG. 11 is a vertical view in cross-section showing a modification of the application of the distant control force for the release and separation of the load from the support.

FIG. 12 is a sectional view showing an alternate construction of the rim of the socket.

Referring to FIGURES 1, 3 and 4, the plug, shown generally at 1, consists of a support rod 3 adapted to be secured at its upper end to a supporting structure by any conventional means. The lower end of rod 3 is enlarged into a hemisphere shape as at 5 and has a plurality of lugs 7 attached thereto.

A plurality of links 9 are pivoted respectively at one of their ends to lugs 7 and pivoted respectively at the other of their ends to one of the ends of links 11. The other of the ends of links 11 are pivoted respectively to lugs 13 on hollow piston 15. Links 9 and 11 pivot on each other to form toggles 16, and the toggles pivot on lugs 7 and 13. The pivotable connections between the links and at the ends of the links (with the lugs) are made by pins 17. Spring 19, bearing against hemisphere 5 and the lower face of piston 15, tends to move hemisphere 5 and piston 15 apart until links 9 and 11 are in a substantially straight line, unless otherwise restrained, as will be explained later herein. When the links 9 and 11 are substantially in a straight line relative to each other, as shown in FIG. 1, the plug 1 is defined as being in a "collapsed" condition and is ready to be inserted into a socket, shown generally at 37. The insertion occurs as the body to be supported, with the socket affixed, is moved toward the supporting structure.

The upward movement of piston 15 is limited by the position of piston seat 23, which is moved up and down by its being turned on threads 21 on rod 3. Flange 25 of piston seat 23 extends radially outward to an extent sufficient to engage lugs 13 on piston 15. Piston seat 23 is turned on threads 21 by a conventional spanner wrench (not shown), engaging holes 27 in flange 25.

The lower face of piston 15 is in pressure-tight sliding contact with rod 3 and the diameter of the inner surfaces of piston 15 is such that this inner surface is in pressure-tight contact with the outer surface of piston seat 23.

Piston 15 is moved relative to piston seat 23 by a fluid under pressure from a conventional source (not shown) connected to bore 29 in rod 3 and through transverse ports 31.

A cover 33 having a skirt 35 and threaded in its central opening to engage threads 21 on rod 3, is provided to close the flared opening of socket 37.

The socket, shown generally at 37, is of a hollow conical shape, fitted with threads 39 to engage threads in the load (not shown). The lower inner surface 41 of socket 37 is hemispherical and of a form corresponding to the outer surface of hemisphere 5 on plug 2. The side walls 43 of the socket flare outward to rim 45 at which position a threaded bushing 47 is secured to socket 37 by threads 46 on the socket and threads 49 on the bushing.

In the lower portion of bushing 47 is machined the buttress surface 51 for engagement with the upper ends of links 9 and the outer ends of links 11. This surface slopes upwardly and inwardly from the vertical.

An alternate rim construction for the socket is shown in FIGURE 12. It would be cheaper than that shown in FIGURE 2, but might require critical tolerances in the dimensions of various parts of the plug.

An alternate construction to apply a motive force for moving piston 15 relative to piston seat 23 is shown in FIG. 11. The source of fluid pressure is led to transverse ports 31 through bore 53 in rod 4 and hemisphere 5 and through bore 55 in the base of socket 37.

In operation:

Plug 1 is fastened to a structure support (not shown) by rod 3. The plug is in its upward collapsed condition, as shown in FIGS. 1 and 6, that is, the links 9 and 11 are substantially in alignment, the piston 15 to which links 11 are pivoted being forced upward by spring 11 against flange 25 of piston seat 23. Cover 33 threaded to rod 3 is clear of flange 25. The plug 1 in its collapsed condition presents but a portion of the area within the rim 45 of socket 37 and thus provides considerable leeway in the initial insertion of plug 1 into socket 37 by hoisting the load and its socket 37 until hemisphere 5 of rod 3 contacts surface 41 of socket 37.

In FIGURE 7, which is schematic, plug 1 has been inserted into socket 37 but there is an obvious mis-alignment, as the axes of plug 2 and socket 37 do not coincide. Despite the mis-alignment, hemisphere 5 and surface 41 of socket 37 are in spherical contact, and in FIGURE 7, may function as a ball-and-socket joint.

With the lifting or hoisting mechanism (not shown) supporting the load, piston seat 23 is now moved down rod 3 by turning it on the threaded portion 21. This movement exerts a downward thrust on piston 15, to which links 11 are pivoted. The thrust is transmitted to links 9, which are unable to move downward as their lower ends are pivoted on hemisphere 5. Further downward movement of piston seat 23 causes links 11 and 9 to act as toggles as shown in FIGURE 8. (If the links tend to hang up on dead center the operator can pry them outward with a suitable tool to start the toggle action.) Because of the mis-alignment condition, all links 9 will not contact wall 43 of socket 37 simultaneously. The first link 9 (or first two links 9, if such be the case) to contact wall 43 will, by toggle action as piston 15 is forced closer to hemisphere 5 by movement of piston seat 23, pivot the load around the ball-and-socket joint formed by surface 41 and hemisphere 5, to the position shown in FIGURE 9, which is a schematic view corresponding to FIGURE 3.

In FIGURE 3 the load is firmly attached to the supporting structure as the plug and socket are mechanically attached together. After the alignment of the socket and the plug has been accomplished as described above, bushing 47 is screwed down into rim portion 45 until buttress surface 51 contacts links 9, as shown in FIGURE 3. The load is therefore attached, as links 9 are serving as a mechanical connection between hemisphere 5 and bushing 47.

In FIGURE 3, the load is sway-braced by links 11, the inner portions of which are pinned to piston 15. It may be noted in FIGURE 3 that buttress surface 51 of bushing 47 engages links 11 as it is screwed down, and exerts an inward wedging effect on the links, thus tending to maintain the alignment of rod 3 and socket 37. The dimensions of the links and the angle of the buttress may be so chosen as to provide a substantial sway-brace effect.

When the plug and socket are attached together, cover 33 may be moved down rod 3 to the position shown in FIG. 3. If the cover is positioned too far down rod 3 it may interfere with the release action of the toggles described hereinafter.

The lineal dimensions of socket 37 and the inclination to the vertical of buttress surface 51 and the lineal dimensions of the parts of plug 1 and the positions of those parts when the toggles are in their expanded conditions, as shown in FIG. 4, may be so selected that the surfaces of links 9 and 11 at their respective junctures are in direct and intimate attachment contact with buttress surface 51 of socket 37. In this attachment condition socket 37 is supported by rod 3 through links 9 and links 9 are prevented from moving away from buttress surface 51 by links 11, which links also prevent socket 37 from swaying from side to side.

In the attachment condition, links 11 extend substantially at right angles to rod 3, but slope slightly upwardly as they approach piston 15. In this relative position, a slight upward thrust is exerted by piston 15 against piston seat 23 to insure that inertia forces created by sudden movements of the supporting structure will not move the links 11 below their horizontal positions and thus permit links 9 to move away from buttress surface 51. An upward force is also exerted on piston 15 by spring 19 which is compressed between piston 15 and the flat surface of hemisphere 5.

In moving the load and its socket 37 upwardly into attachment relative to plug 1, it is not always necessary that piston seat 25 be positioned so high along rod 3 that links 9 and 11 are substantially in alignment. When there is practically no relative movement between socket 37 and plug 1, as when attaching a bomb to an airplane on land or on board a ship in a calm sea, piston seat 23 may be screwed down to expand the toggles 16 so that piston seat 23 does not need to be screwed down through such a long distance while the socket surface 41 is held in contact with hemisphere 5.

When it is desired to release socket 37 from plug 1, a fluid under pressure is applied to the bore 29 in plug 1, which fluid is conducted to the space between piston 15 and piston seat 23 through ports 31, thus forcing the piston 15 downwardly. As piston 15 moves downwardly, the surfaces of links 9 and 11 at their junctures are drawn inward and clear of buttress surface 51 of socket 37, permitting the socket to be released from plug 1.

To effect forcible separation of the socket from the plug, the vertical length of piston seat 23 is made short enough with relation to the vertical length of piston 15 such that when piston 15 has moved downwardly to a position sufficient for links 9 and 11 to be drawn away from buttress surface 51, the piston 15 becomes disengaged from piston seat 23 and the fluid under pressure will fill the space between cover 33 and the side walls of socket 37 and thus forcibly separate socket 37 from the plug assembly.

When the modification shown in FIG. 11 is used, fluid under pressure is applied to bore 55 in socket 37 and bore 53 in plug 1, which fluid is conducted to the space between piston 15 and piston seat 23 through ports 31. This alternative arrangement can be used if the fluid control station is located on the body into which socket 37 is screwed.

An alternate rim construction for socket 37 is shown in FIGURE 12. Buttress surface 52 is formed integral with the sidewall 43 of the socket. This construction would be cheaper than the two-piece design shown in FIGURE 2 and would be used similarly except that it provides no adjustment of the distance between buttress surface 51 and surface 41.

It is obvious that the invention has been illustrated and described only by way of example and that various modifications can be made therein without departing from the scope of the invention as defined in the appended claims. As an example of such modifications, the bushing in the socket may be eliminated by thickening the rim of the socket and providing in the thickened rim a buttress surface.

What I claim is:

1. An attachment-release system comprising: a hollow conical socket having a rim with an inner buttress surface at the divergent end thereof and a spherical inner surface at the convergent end thereof; a plug having a central rod adapted at one end to be secured to a supporting structure and adapted at the other end to engage and pivot on said spherical surface; a member slideable on said rod; a plurality of toggles each having one end pivoted on said member and the other end pivoted on said other end of said rod; means for moving said member along said rod whereby said toggles are expanded outwardly into and held in attachment engagement with said buttress surface; and means for collapsing said toggles inwardly out of attachment engagement with said buttress surface whereby the said plug is released from said socket.

2. An attachment-release system comprising: a hollow conical socket having a rim with an inner buttress surface at the divergent end thereof and a spherical inner surface at the convergent end thereof; a plug having a central rod adapted at one end to be secured to a supporting structure and adapted at the other end to engage and pivot on said spherical surface; a member slideable on said rod; a plurality of toggles each having one end pivoted on said member and the other end pivoted on said other end of said rod; means for moving said member along said rod whereby said toggles are expanded outwardly into and held in attachment engagement with said buttress surface; means for collapsing said toggles inwardly out of attachment engagement with said buttress surface whereby the said plug is released from said socket; and means for forcibly separating said socket from said plug.

3. An attachment-release system comprising: a hollow conical socket having a buttress surface on the inner surface of the divergent end thereof and a spherical inner surface at the convergent end thereof; a plug having a central rod adapted at one end to be secured to a supporting structure, a piston slidable on said rod, a plurality of toggles pivoted at one of their ends on the other end of said rod and pivoted at their other ends on said piston, means to expand said toggles outwardly into and to hold said toggles in attachment engagement with said buttress surface, and means to collapse said toggles inwardly out of attachment engagement with said buttress surface, whereby said socket is released from said plug.

4. The combination set forth in claim 3 and further characterized by: said expanding means comprising a piston seat positionable along said rod and in contact with said piston, whereby the positions of said piston seat relative to the said other end of said rod determines the extent of said expanding of said toggles.

5. The combination set forth in claim 3 and further characterized by the said collapsing means comprising: means for applying a force between said piston and said piston set whereby said piston is moved along said rod away from said piston seat thereby withdrawing said toggles from contact with said buttress surface.

6. The combination set forth in claim 4 and further characterized by the said collapsing means comprising: a source of fluid under pressure and bores within said rod communicating with said source and the space between said piston and said piston seat, whereby relative movement between said piston and said piston seat caused by the application of said fluid under pressure withdraws said toggles from said buttress surface.

7. An attachment-release system comprising: a hollow conical socket having a rim with an inner buttress surface at the divergent end thereof and a spherical inner surface at the convergent end thereof; a plug having a central rod adapted at one end to be secured to a supporting structure and adapted at the other end to engage and pivot on said spherical surface; a member positionable on said rod; a plurality of toggles pivoted at one of their ends on said member and pivoted at their other ends on said other end of said rod, the said member being so positionable on said rod in relation to the lengths of the links of said toggles and the relative position of said buttress surface to the center of the said spherical surface of said socket that both links of each of said toggles are in intimate and locked attachment contact with said buttress surface, whereby one of the links of said toggles supports said socket on said rod and whereby the other of said links of said toggles prevents side movement and sway of said socket relative to said plug.

8. The combination set forth in claim 7 with the further provision that in said intimate and locked attachment contact the links of said toggles pivoted on said member extend at substantially right angles to the axis of said rod.

9. An attachment-release system comprising: a hollow conical socket having a rim with an inner buttress surface at the divergent end thereof and a spherical inner surface at the convergent end thereof; a plug having a central rod adapted at one end to be secured to a supporting structure and adapted at the other end to engage and pivot on said spherical surface; a member positioned on said rod; a plurality of toggles pivoted at one of their ends on said member and pivoted at their other ends on said other end of said rod, resilient means between said member and said other end of said rod, the said member being so positioned on said rod that the links of said toggles are substantially in alignment, whereby the said plug may be inserted in said socket until said other end of said rod is in contact with said spherical surface of said socket, whereupon further relative movement of said socket toward said plug expands said toggles until said links of each of said toggles are in attachment contact with said buttress surface, the position of said member on said rod and the length of the links of said toggles pivoted on said member being such that said member-pivoted links extend substantially outward at right angles to said rod, and means for collapsing said toggles inwardly out of attachment engagement with said buttress surface.

10. An attachment-release system comprising: a hollow conical socket having a buttress surface on the inner side of the rim of the divergent end thereof and having a general spherical surface on the inner side of the convergent end thereof; a plug having a central rod adapted at one end to be secured to a supporting structure and adapted at the other end to contact and pivot on said general spherical surface, pivot lugs on said contact end of said rod, a member slidable on said rod and having pivot lugs thereon, a plurality of pairs of links, the links of each pair being pivoted at one of their ends on each other and pivoted respectively at the other of their ends on said contact lugs and on said member lugs, resilient means positioned on said rod and engaging and forcing apart said contact end of said rod and said member, means on said rod for limiting and varying the position of said member on said rod, whereby the said plurality of links are expanded from substantially aligned positions for the insertion of said plug into said socket to expanded positions wherein said links are in attachment contact with said buttress surface, and means for moving said member relative to said rod, whereby the said links are moved out of attahcment contact with said buttress surface and said socket is released from said plug.

11. An attachment-release-separation system comprising: a hollow conical socket having a buttress surface on the inner surface of the divergent end thereof and a spherical inner surface at the convergent end thereof, a plug having a central rod adapted at one end to be secured to a supporting structure, a piston slidable on said rod, a plurality of toggles pivoted at one of their ends on the other end of said rod and pivoted at their other ends on said piston, a piston seat positionable and movable on said rod whereby said toggles are expanded outwardly into and held in attachment engagement with said buttress surface, a cover positioned on said rod and in fluid tight contact with the rim of said socket and said rod, a source of fluid under pressure, bores within said rod communicating with said fluid source and the space between said piston and said piston seat, the relative movement between the piston and the piston seat to collapse the said toggles from attachment engagement with said buttress source being greater than the distance the piston moves in contact with said piston seat, whereby the said fluid under pressure is released into the space between said cover and said socket and said socket is forcibly separated from said plug.

References Cited in the file of this patent
UNITED STATES PATENTS

| | | |
|---|---|---|
| 1,557,795 | Bolgiano | Oct. 20, 1925 |
| 1,619,254 | Hart | Mar. 1, 1927 |
| 2,108,174 | Mays | Feb. 15, 1938 |
| 3,002,774 | Chapellier | Oct. 31, 1961 |
| 3,009,730 | Gantschnigg et al. | Nov. 21, 1961 |
| 3,089,387 | Damm | May 14, 1963 |